US 11,432,913 B2

(12) United States Patent
Grünenfelder et al.

(10) Patent No.: US 11,432,913 B2
(45) Date of Patent: Sep. 6, 2022

(54) ARTICULATOR AND ARTICULATOR AUXILIARY DEVICE

(71) Applicant: Ivoclar Vivadent AG, Schaan (LI)

(72) Inventors: Robert Grünenfelder, Vaduz (LI); Wolfgang Dawedeit, Keltern (DE); Alexander Schröck, Ispringen (DE); Fabian Lüppens, Pforzheim (DE)

(73) Assignee: Ivoclar Vivadent AG, Schaan (LI)

( * ) Notice: Subject to any disclaimer, the term of this patent is extended or adjusted under 35 U.S.C. 154(b) by 289 days.

(21) Appl. No.: 15/922,002

(22) Filed: Mar. 15, 2018

(65) Prior Publication Data

US 2018/0263738 A1  Sep. 20, 2018

(30) Foreign Application Priority Data

Mar. 16, 2017  (DE) .......................... 102017105729.3

(51) Int. Cl.
*A61C 11/02* (2006.01)
*A61C 11/00* (2006.01)
*A61C 11/06* (2006.01)
*A61C 11/08* (2006.01)

(52) U.S. Cl.
CPC .......... *A61C 11/025* (2013.01); *A61C 11/003* (2013.01); *A61C 11/06* (2013.01); *A61C 11/081* (2013.01)

(58) Field of Classification Search
CPC ..... A61C 11/025; A61C 11/003; A61C 11/06; A61C 11/081
See application file for complete search history.

(56) References Cited

U.S. PATENT DOCUMENTS

| 4,128,942 A * | 12/1978 | Schleich | A61C 11/08 |
| | | | 433/60 |
| 7,210,932 B2 * | 5/2007 | Honstein | A61C 9/002 |
| | | | 433/57 |
| 2006/0281043 A1 * | 12/2006 | Huffman | A61C 9/002 |
| | | | 433/50 |

(Continued)

FOREIGN PATENT DOCUMENTS

| DE | 505942 | 8/1930 |
| DE | 2430703 A1 | 1/1976 |
| DE | 2554410 | 9/1976 |

*Primary Examiner* — Nicholas D Lucchesi
*Assistant Examiner* — Hao D Mai
(74) *Attorney, Agent, or Firm* — Ann M. Knab; Thad McMurray

(57) ABSTRACT

An articulator having a maxillary member and a mandibular member, which are connected to each other via condylar articulations, wherein a maxillary adaptor is attachable or attached at the maxillary member and a mandibular adaptor at the mandibular member, wherein a maxillary alignment member especially is form-fittingly connected to the maxillary adaptor and a mandibular alignment member is especially form-fittingly connected with the mandibular adaptor, and wherein the alignment members are automatically alignable to each other and comprising scanning members, by means of which the arrangement of alignment members and adaptors is scannable in a scanner and especially the relative position thereof moreover is detectable in relation to the articulator via the scanner.

13 Claims, 5 Drawing Sheets

(56) References Cited

U.S. PATENT DOCUMENTS

| | | | | |
|---|---|---|---|---|
| 2007/0190492 A1* | 8/2007 | Schmitt | ............... | A61C 13/0004 |
| | | | | 433/213 |
| 2007/0292004 A1* | 12/2007 | Peters | .................. | A61C 19/045 |
| | | | | 382/120 |
| 2008/0032256 A1* | 2/2008 | Thornton | ............. | A61C 9/0006 |
| | | | | 433/57 |
| 2009/0305185 A1* | 12/2009 | Lauren | .................... | A61C 11/00 |
| | | | | 433/29 |
| 2010/0106275 A1* | 4/2010 | Andersson | ........... | A61C 9/0006 |
| | | | | 700/98 |
| 2010/0124731 A1* | 5/2010 | Groscurth | ................ | A61C 9/00 |
| | | | | 433/213 |
| 2010/0143858 A1* | 6/2010 | Okkerse | ............... | A61C 11/022 |
| | | | | 433/34 |
| 2012/0230567 A1* | 9/2012 | Greenberg | ............... | A61B 6/14 |
| | | | | 382/131 |
| 2014/0295371 A1* | 10/2014 | Huffman | ................ | A61C 11/00 |
| | | | | 433/49 |
| 2014/0313304 A1* | 10/2014 | Adriaens | ............. | A61C 11/005 |
| | | | | 348/77 |
| 2014/0315145 A1* | 10/2014 | Boltanski | ............... | A61C 11/02 |
| | | | | 433/58 |
| 2014/0342306 A1* | 11/2014 | Lerner | ................ | A61C 13/083 |
| | | | | 433/34 |
| 2015/0147726 A1* | 5/2015 | Filtchev | ............... | A61C 1/0015 |
| | | | | 433/213 |
| 2015/0230894 A1* | 8/2015 | Juzbasic | .................. | A61B 6/14 |
| | | | | 433/29 |
| 2018/0110603 A1* | 4/2018 | Stipek, Sr. | ............. | A61C 11/06 |
| 2018/0153658 A1* | 6/2018 | Azer | .................... | A61C 11/022 |

\* cited by examiner

ARTICULATOR AND ARTICULATOR AUXILIARY DEVICE

CROSS-REFERENCE TO RELATED APPLICATIONS

This application claims priority to German patent application No. 102017105729.3 filed on Mar. 16, 2017, the disclosure of which is incorporated herein by reference in its entirety.

TECHNICAL FIELD

The invention relates to an articulator, an articulator accessory device, an articulator so scanning system, as well as a process for calibrating a scanner to an articulator.

BACKGROUND OF THE INVENTION

Articulators have been known for a long time, for example from DE 505 942 A1 or DE 25 54 410 C1 and corresponding U.S. Pat. No. 4,128,942A, which is hereby incorporated by reference.

In such articulators, a maxillary impression or a prosthesis is attached at a maxillary plate or a maxillary member, in relation to the maxillary portion, and accordingly, a mandibular impression or a prosthesis is attached at a mandibular plate or a mandibular member in relation to the mandibular portion.

The attachment is typically done via a fixing material or a casting compound such as gypsum. In order to protect the maxillary member and the mandible member from contacting the gypsum, a gypsum protective plate is employed, such as, for example seen from the manual of the articulator Stratos 300 of the present applicant.

Articulators have been provided with mounting plates for the attachment of dental spare parts for a long time. A respective mounting plate is located at each of the maxillary member and at the mandibular member of the articulators, and for the connection to the dental restoration part, for example a prosthesis, a connection is fabricated of a fixing material, such as gypsum, the connection subsequently fixing the spatial position of the prosthesis in the articulator. Via the articulator, the dental restoration may subsequently be controlled and will eventually be adapted, wherein, of course, gnathological points of view may also be considered.

An example for such a mounting plate may be seen from DE 24 30 703 A1. Such solutions are still being employed today, i.e. 40 years later, even though they involve the disadvantage that the articulator is required to always "travel" together with the associated dental restoration part, i.e. always carrying the dental restoration part during working thereon. This results in the requirement to provide a plurality of articulators, which economically is undesirable.

In order to get along with fewer articulators, centering sockets have been employed as far back as the 80's. These sockets synchronize articulators among one another, so that mounting plates including dental restoration parts may be used in different articulators.

An example of such a centering socket that is screw-fixable by a screw connection for centering is disclosed in DE 90 01 729 U1. This centering socket is divided. This solution at least allows alignment of articulators among each other, i.e., to "synchronize", by inserting the same centering socket that is firmly screwed into different articulators, and also allowing detection of tilt errors. By wear or misalignments, for example if the centering bracket is not properly tightened, each articulator may have a defective inclination of the members to each other, and such an inclination may visually be estimated by the divided centering socket according to DE 90 01 729 and eventually allows countermeasures to be taken.

SUMMARY OF THE INVENTION

Contrary to this, the object of the invention is to provide an articulator, an articulator accessory device, an articulator scanning system, as well as a process for calibrating a scanner to an articulator according to the attached claims, which are improved in view of exactness and also have an added value.

In an especially beneficial mode, it is provided according to the invention, to use a mandibular alignment member and a maxillary alignment member in an articulator. Said two members each are connected with an associated adaptor with the maxillary member and/or the mandibular member. The adaptor subsequently is especially form-fittingly connected with the respective associated alignment member, wherein it is especially preferred that a combination of an alignment member and an adaptor is connected to each other via a screwable clamping assembly, the other members being connected by a casting compound. A connection via a casting composition may also be considered as an indirectly form-fitting connection, as typically the alignment member is form-fitting with the casting composition and the casting composition is form-fitting with the adaptor.

According to the invention, it is provided for both alignment members to also be form-fittingly connected to each other, and are connected to each other slightly releasably. The dividing plane preferably is in the area of the Bonwill's triangle, or eventually also is in the area of the occlusal plane. This form-fitting connection of both of the alignment members to each other may for example be realized by grooves and appropriate projections at the common surface of the alignment members, of the occlusal plane, which each preferably comprise inclined flanks, so that the alignment members autonomously align to each other. The alignment members may also be connected to each other by magnetic force, for example, one of the alignment members being ferromagnetic and the other one being paramagnetic, or for example, both alignment members being ferromagnetic such that one of the surfaces facing each other form a magnetic south pole and the other one forming a magnetic north pole. It is also possible that the alignment members, upon alignment to each other, form at least one flush surface.

The connection between the maxillary member and the maxillary adaptor, and the one between the mandibular member and the mandibular adaptor may also be formed accordingly as a magnetic connection and additionally may be formed as a form fitting connection, and alternatively may also be formed as a purely form-fitting connection or as a magnetic connection. They may form a geometric three-dimensional basic shape such as a cube, a pyramid or a shape that is composed of geometrical three-dimensional basic shapes.

According to the invention, it is provided for the alignment members to comprise scanning members with the aid of which the arrangement of alignment members and adaptor is scannable in a scanner. With this solution, almost a virtual synchronization of different articulators is achievable. For this, the dual arrangement of alignment members and adaptors is employed in a scanner, but without a real form-fitting connection between the maxillary alignment member and the maxillary adaptor and the mandibular alignment member and the mandibular adaptor. One of these combinations of the alignment member and the maxillary adaptor is now provided with a clamping assembly, for example a screwable clamping assembly. This will be tightened. Tightening may also be done prior to insertion into the adaptor. In this way, the relative position of adaptor and alignment member is set, and, following abutment of the adaptor at the associated mandibular member, for example abutment of the adaptor at the maxillary member, and connection thereto, moreover, the relative so arrangement between the articulator and the maxillary alignment member, i.e., the occlusal plane thereon is set.

The articulator is now preferably turned around, and the mandibular adaptor is connected to the mandibular alignment member, whereas the mandibular adaptor abuts the mandibular member and is connected thereto. The alignment members will be aligned to each other and casting the connection between the mandibular adaptor and mandibular alignment member is performed.

After curing the casting composition a form-fitting connection is present between the mandibular alignment member and the mandibular adaptor. It will thereby be assured that now a defined and scannable connection is present starting from the maxillary member across the maxillary adaptor, the maxillary alignment member, the mandibular alignment member, and the mandibular adaptor to the mandibular member. This is fixed like a firmly connected centering key allowing the entire unit of alignment members and adaptors for calibration of a scanner to be scanned therein. The articulator model position may thus be transferred into the scanner and therein may articulator-specifically be stored.

Basically, it is also possible, to use two clamp connections instead of one clamp connection and an adhesive connection or cast connection. However, the adhesive connection or cast connection has the advantage, that minimal differences and tolerances from articulator to articulator may thus be compensated.

It is to be understood that the articulator is always required to be brought into the zero position prior to calibration and adjustment. For this, for example, the centric bracket will be closed, to fix the condylar articulation in a zero position. Typically, an articulator comprises an incisal pin and an incisal dot pointer. It is to be understood that it should be oriented towards an impact point of the two alignment members to each other in the sagittal plane in a manner known per se.

The scanning members at the alignment members may be formed in any suitable manner. For example, markers at one or more of the side surfaces of an alignment member are suitable for this. It is preferred that a line, edge or groove is provided in the sagittal plane, which is for calibration of the sagittal plane. Moreover, typically the dividing plane of the two alignment members may be scanned comparably easy and exact by the scanner. For this, the two alignment members suitably comprise a chamfer at the transition between the side walls and the occlusional plane. When both alignment members are placed one over the other, an essentially v-shaped groove results, which may easily and exactly be scanned, to also allow horizontal acquisitions.

According to the invention, it is especially favorable that the articulator may subsequently be "calibrated" in the scanner; conversely, a virtual image of the articulator is acquired and is used as a base for the scanner for calibration. The scanner preferably is formed as a three-dimensional scanner, acquiring the position of the alignment members in the space. For this, mounting the arrangement is preferably provided relative to the adaptors and alignment members. Theoretically, the entire articulator including the adaptor and alignment members employed could be inserted into the scanner, and the calibration may be performed therein. However, it is preferably provided for the scanner to comprise a mounting area, into which and at which the arrangement of adaptors and alignment members may be inserted. The mounting area is compatible in shape to the respective retention plate at the maxillary member or the mandibular member.

The articulator including the adaptor and the alignment members, or the combination of adaptor and alignment member will now be three-dimensionally scanned following insertion into the scanner, thereby acquiring the spatial position of the alignment members and thus of the Bonwill's triangle. This corresponds to the mandibular incisal point that is marked by the alignment members in the spatial plane corresponding to the position of the occlusal planes of the alignment members.

Preferably, the alignment members are shaped in a geometric basic shape, for example, as viewed in the top view, are triangular, or, as viewed in the top, are square in shape. The occlusal planes subsequently generally only cover a portion of the Bonwill's triangle, wherein it is to be understood that the position of the Bonwill's triangle in the space obviously results.

Typically, this position extends corresponding to the Balkwill's angle in an angle of 20 to 30° of the occlusal plane.

Alternatively, it is provided for the combination of alignment members and adaptors to be placed onto a predetermined support, such as a scanner, which it uses for scanning a mouth interior space, acquiring the relative position of the alignment members and the associated scanning members in relation to the support.

The support may be a table, which is firmly attached to the scanner, or for example a common support for the scanner and the members to be scanned. Alternatively, the combination of alignment members and adaptors may also remain inserted into the articulator, and the scanner may consider the height of the articulator, which is placed on the support, in calibrating.

As alignment members, any suitable shaped bodies may be used. It is beneficial, if the two alignment members are formed to each other in a self-centering, form-fitting manner. This reduces risk of improper operation, and it is possible to transfer high precision of the occlusal plane, the Bonwill's plane, the incisal point and the bilateral symmetry of the mandible into the CAD software.

According to the invention, it is furthermore beneficial, that no plastering work are to be performed, thus being able to avoid pollutions of the articulator related therewith. What is also beneficial is little expenditure of work and time due to the attachment that preferably is provided, and is preferably provided both between the mandibular member and the mandibular adaptor and also between the maxillary member and the maxillary adaptor.

As a casting compound beneficial according to the invention, any suitable casting compound may be used. As casting compounds, herein especially casting compounds are considered having minimum shrinkage. With such a casting compound it will be avoided that a gap arises between the bodies, between which casting is performed. Especially suitable are two epoxy resins with metal fillers. Such casting compounds are also be referred to as a liquid metal. They are thus dimensionally stable and especially suitable.

The alignment members may be pot-shaped, and if the mandibular alignment member is to be cast with the mandibular adaptor being inserted, the articulator briefly is turned and casting is performed. The articulator subsequently remains in this position until the casting compound is cured.

In a pot-shaped embodiment of the alignment members, the adaptors are each inserted therein. For the attachment of the arrangement free of casting compound of adaptor and alignment member, for example, a clamping assembly may be provided, wherein appropriate expanding members of the adaptor interiorly abut the alignment member thus providing form closure.

However, it is to be understood that any other clamping assembly is possible as well, but a snap-in attachment or a detent attachment is possible.

In another advantageous embodiment it is provided that, via a firm connection, such as a screw connection, the alignment members are firmly attached to each other. This, in addition to the herein preferred virtual synchronization, to also allow analogous synchronization of articulators. Such an arrangement of screwed alignment members and adaptors subsequently quasi acts as a screwed centering key according to DE-90 01 729 U1

In an advantageous embodiment it is provided that the combination of alignment members and adaptors is formed as an articulator accessory device. The articulator accessory device permit autonomous operation in combination matching the associated articulator. Typically, the mandibular members of the articulators comprise retention plates, and the articulator accessory device suitable for the articulator subsequently each comprise a suitable counter retention plate at each bottom side of the mandibular adaptor and/or at the top side of the maxillary adaptor, such that the retention plate and the counter retention plate matches each other.

By "matching" herein any manner of matching is to be understood, especially a form closure that promoted by magnetic force.

It is preferred that also herein, self-centering is provided so that the actual magnetic force draws each combination of retention plate and counter retention plate into the centered position.

Also herein, it applies that preferably the alignment members, for example in the embodiment having V-shaped grooves and respective projections, are automatically centered to each other in a magnetically promoted manner.

The attachment of the pair of alignment member and adaptor that is free of casting compound may suitably be realized by a clamping. Preferably, a ball-clamping member, which extends outwards, i.e. towards the alignment member and a safe anchoring of the adapter at the alignment member is allowed for this.

BRIEF DESCRIPTION OF THE DRAWINGS

Further details, advantages and features will arise from the following description of a working example of the invention by way of the figures, wherein.

DETAILED DESCRIPTION

Figure 1:
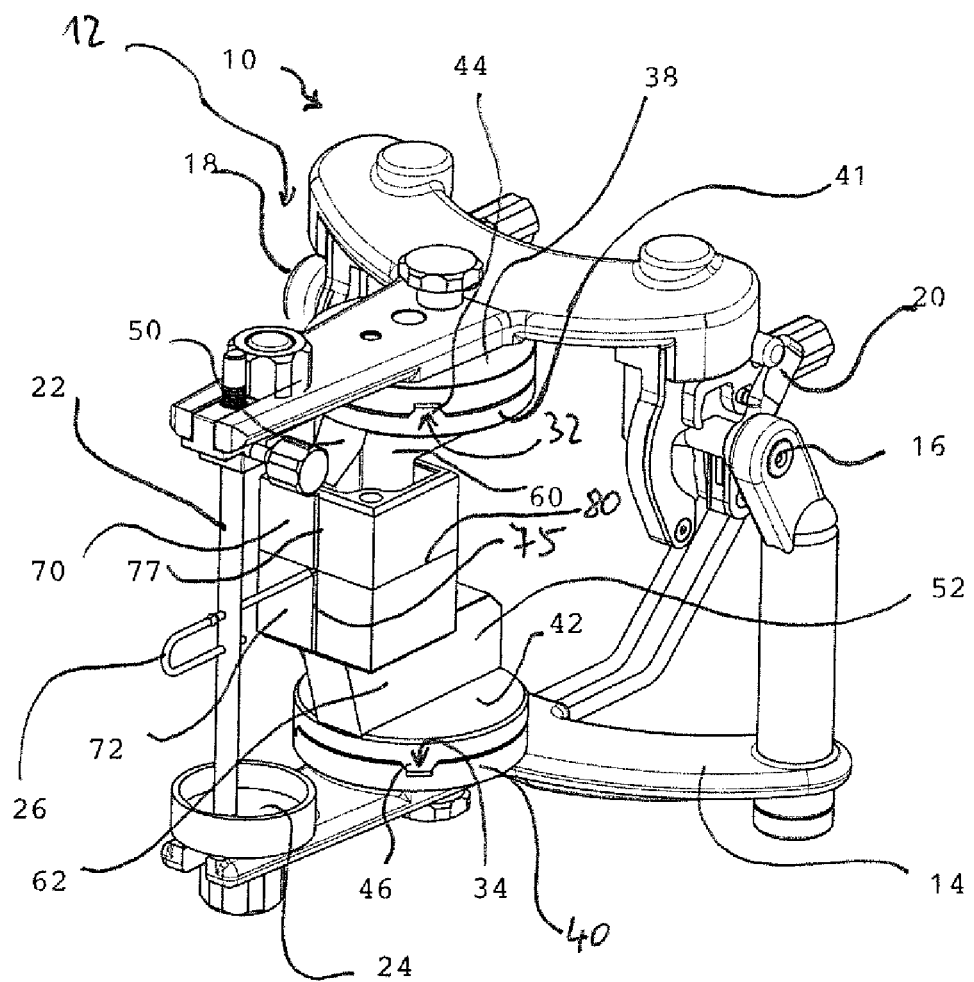
FIG. 1 is an embodiment of an articulator according to the invention having arrangements of alignment members and adaptors, in a perspective representation.

The articulator 10 represented in FIG. 1 comprises a maxillary member 12 and a mandibular member 14. Said members are hinged to each other via condyle articulations 16 and 18 known per se. Corresponding to the human condyles, with the condylar articulations 16 and 18, different movements, for example protrusion, retrusion or laterotrusion movements may be simulated, but also for example a side shift.

However, each condyle articulation comprises a centric bracket, of which the centric bracket 20 is to be seen in FIG. 1. With said bracket, the respective condylar articulation 16 or 18 may be fixed such that only one pivoting movement remains to be possible.

The condylar articulations cooperate with an incisal pin 22, which is attached at the maxillary member 12 in the front region in a manner known per se and is vertically adjustable in a manner known per se. The incisal pin 22, upon horizontal alignment of the articulator 10, rests in an incisal plate 24 in the front region at the mandibular member 14.

Moreover, the incisal pin 22 has an incisal pointer 26 in the occlusal plane. Both the incisal pin 22 and the incisal pointer 26 extend in the sagittal plane.

The members of an articulator so far described in the description of the Figures are known per se, for example from the Articulator Stratos 300 of the present applicant.

According to the invention, the maxillary member 12 comprises a specifically formed retention plate 38, and the mandibular member comprises a retention plate 40 symmetrical thereto. Each retention plate, in the represented embodiment, is circular and comprises grooves 32 and/or 34, which have inclined flanks.

The retention plates 38 and 40 cooperate with counter retention plates 41 and 42. The counter retention plates having projections 44 and 46, fitting into the grooves 32 and 34.

The counter retention plate 41 is part of a maxillary adaptor 50 and the counter retention plate 42 is part of a mandibular adaptor 52.

The retention plates 38 and 40 each magnetically attract with the counter retention plates 41 and 42. Due to the inclined sidewalls of the projections and grooves, a self-centering is done.

The maxillary adaptor 50 comprises a supporting leg 60 obliquely extending forward, and the mandibular adaptor 52 comprises a supporting leg 62 obliquely extending forward. They terminate into an attachment extension 64 and/or 66, which may be seen in FIGS. 4a and 4b. The function thereof is described in detail further below, also by way of FIGS. 4a and 4b.

The maxillary adaptor 50 therein immerses into a maxillary alignment member 70a, and, accordingly, the mandibular adaptor 52 immerses into a mandibular alignment member 72. Those alignment members 70 and 72 each are essentially pot-shaped having an essentially square cross section. They each comprise occlusal planes 74 and 76, where they abut each other.

Both the maxillary alignment member 70 and the mandibular alignment member 72 each comprise scanning members 75, 77. In the represented working example, the scanning members 75 and 77 are notches or grooves vertically extending in the sagittal plane. Moreover, the transition from the occlusal plane 74 to occlusal plane 76 is formed by a line of vision 80. This dividing line between the maxillary adaptor 50 and the mandibular adaptor 52 is also visible from the outside and as a scanning member is scannable by the scanner. Scanning members may include any type of indicator that a scanner can read to assist in providing alignment information of the alignment members.

In total, the body formed of the adaptors 50 and 52 essentially form a cube with flat side surfaces. Therefore, the side surface of the adaptors 50 and 52 are flush to each other.

The occlusal planes 74 and 76 are profiled per se, similar to the cooperation of the retention plates with the counter retention plates, and the adaptors are also magnetically connected to each other.

Figure 2:
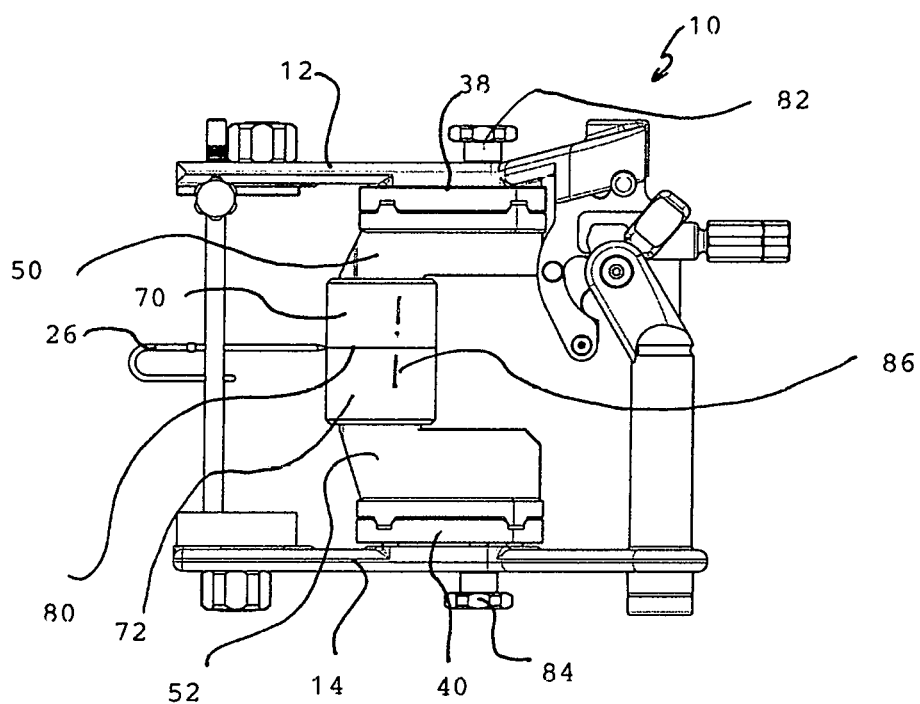
FIG. 2 is a side view of the articulator according to FIG. 1.

From FIG. 2 it may be seen, that the edge of vision 80 is arranged at the same height level as the incisal pointer 26. As it is apparent from FIG. 2, the retention plates 38 and 40 are releasably attached via knurled nuts or knurled screws 82 and 84 to the members 12 and 14. With this, the unit of the adaptors 50 and 52, the alignment members 70 and 72 and the retention plates 38 and 40 may smoothly also be transferred into another articulator 10.

When the alignment members 70 and 72, corresponding to the figurative represented screw connection 86, are screwed to each other, the said parts also form a firm unit, so that they may serve as centering pin for the classical synchronization of articulators.

Figure 3:
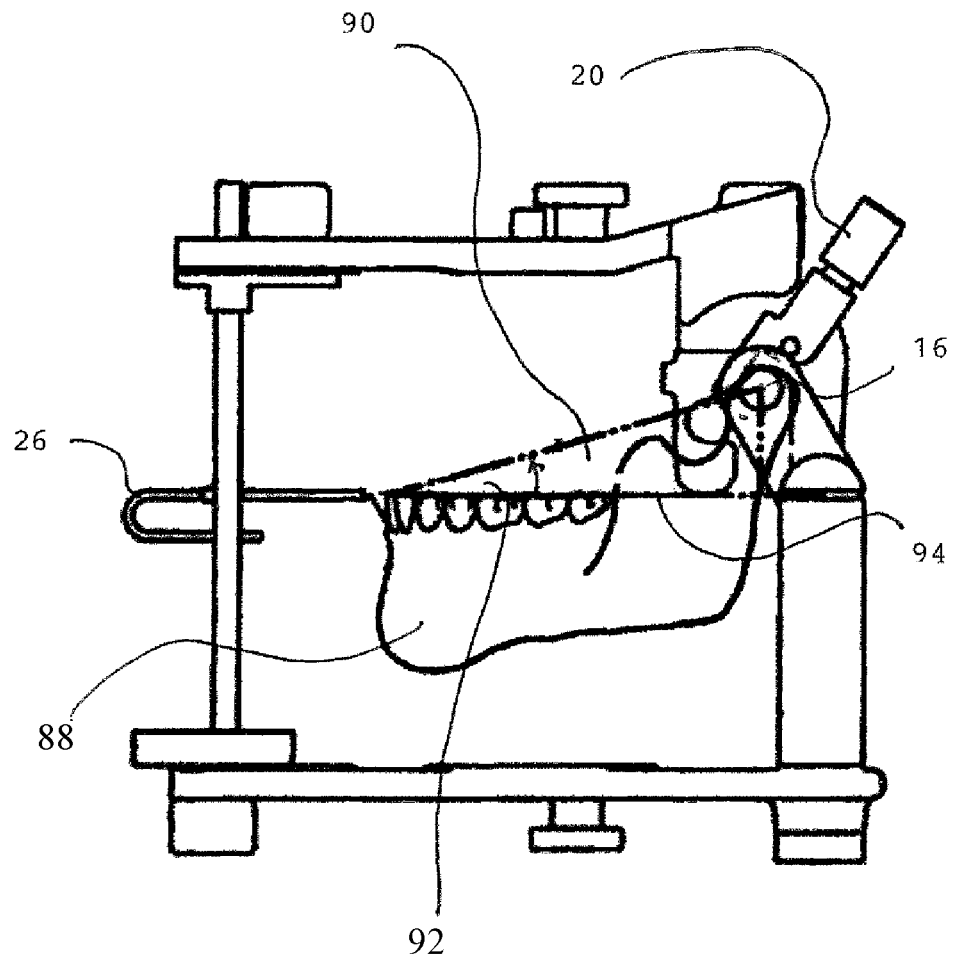
FIG. 3 is the articulator according to FIGS. 1 and 2, but having inserted the mandibular prosthesis in schematic representation.

From FIG. 3 it may be seen, at which height level a mandibular prosthesis 88 becomes located in the articulator 10. Due to the height, level offset between the condyle articulation 16 and the incisal pointer 26 the Bonwill's triangle 90 results in a manner known per se, having the Baikwill's angle 92 in relation to the occlusal plane 94.

Figure 4A:
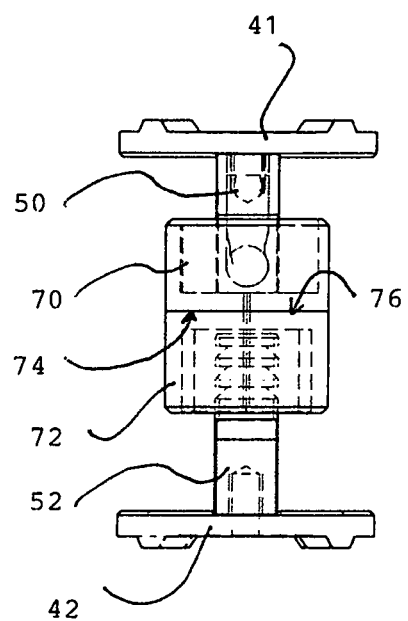
FIG. 4a is a front view of an arrangement of alignment members and adaptors for an articulator according to the invention.
Figure 4B:
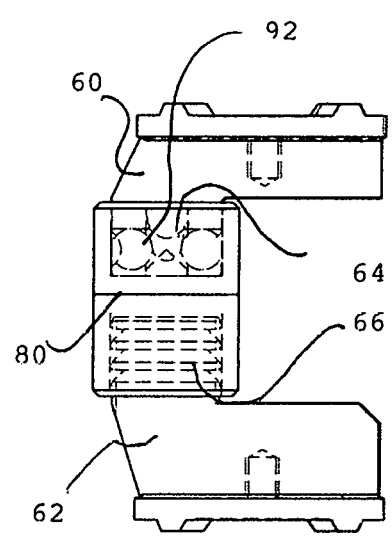
FIG. 4b is the view according to FIG. 4a in a side view.

From FIG. 4a, the maxillary and mandibular adaptors 50 and 52 including the alignment members 70 and 72 may be seen. The maxillary adaptor 50 terminates on top with the counter retention plate 41, and the adaptor 52 terminates at the bottom with the counter retention plate 42. The maxillary adaptor 50 immerses into the maxillary alignment member with the attachment extension 64. A ball clamping connection 92 is formed therein, allowing safely locking between the adaptor 50 and alignment member 70 by spreading out balls.

Following attachment of the adapters 50 at the alignment member 70 now the articulator with the adapter/alignment member arrangement being inserted is briefly turned. In this case, the pot-shaped alignment member 72 is arranged such that the open side thereof is on top. The attachment extension 66 of the adaptor 52 protrudes into this open side. The peripheral gap thereof towards the alignment member 72 is briefly cast with epoxy resin. The epoxy resin cures so that a tight and aligned connection between the alignment member 72 and the adaptor 52 results.

With this, even minimal variances between the different articulators may be detected through the alignment member according to the invention and the scanning members 75 and 77 according to the invention and may be stored through the scanner, so that the relative position of the arrangement is obtained from alignment members and adaptors and is detectable in relation to the articulator, thereby being storable.

Figure 5:
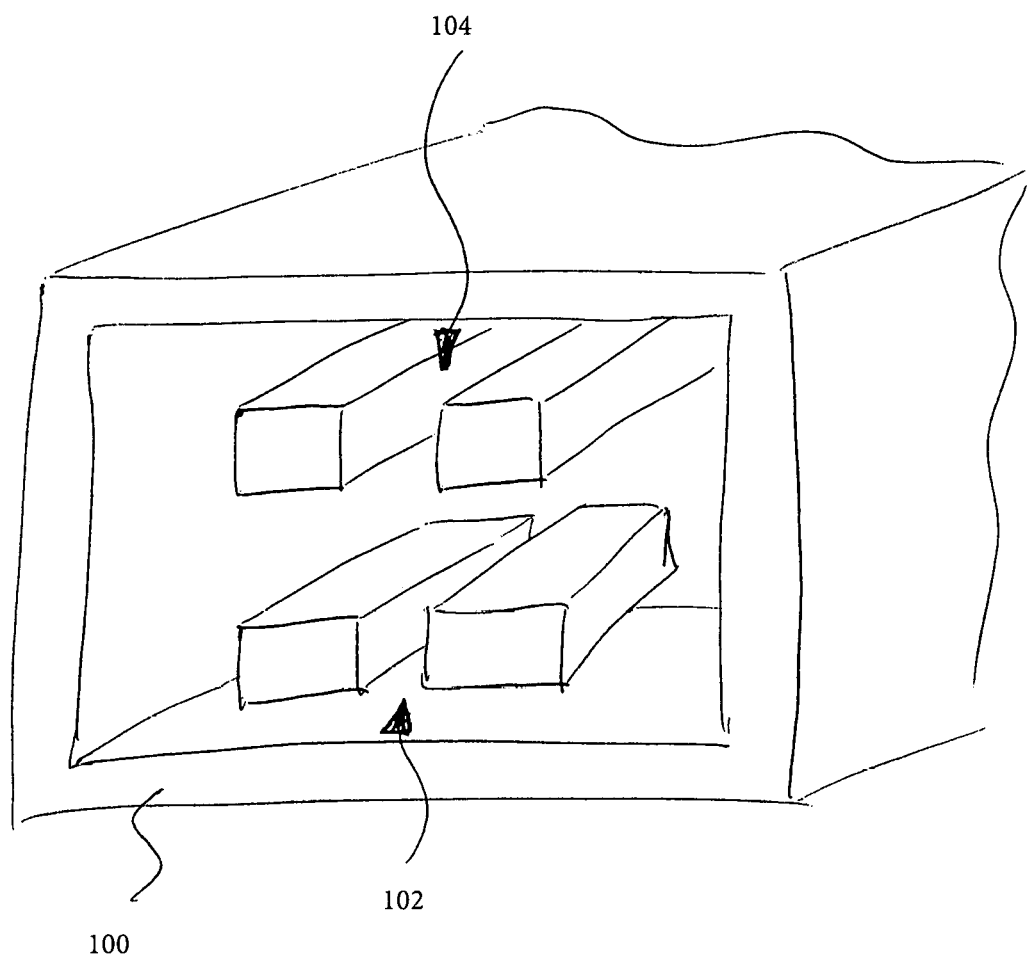
FIG. 5 is a schematic view of a scanner in accordance with the invention.

FIG. 5 is directed to a scanner 100 having an mounting segments or areas 102 and 104 for mounting an arrangement of adaptors and/or alignment members. The mounting area is preferably compatible in shape to the respective retention plate at the maxillary member or the mandibular member.

The articulator including the adaptor and the alignment members, or the combination of adaptor and alignment member can be three-dimensionally scanned following insertion into the scanner, thereby acquiring the spatial position of the alignment members and thus of the Bonwill's triangle. This corresponds to the mandibular incisal point that is marked by the alignment members in the spatial plane corresponding to the position of the occlusal planes of the alignment members.

Although preferred embodiments have been depicted and described in detail herein, it will be apparent to those skilled in the relevant art that various modifications, additions, substitutions, and the like can be made without departing from the spirit of the invention and these are therefore considered to be within the scope of the invention as defined in the claims which follow.

The invention claimed is:

1. An articulator comprising
a maxillary member having a first retention plate and
a mandibular member having a second retention plate,
wherein the maxillary and mandibular members are connected to each other via condylar articulations,
a maxillary adaptor having a third retention plate below the first retention plate and attachable or attached to the first retention plate of the maxillary member and a mandibular adaptor having a fourth retention plate above the second retention plate attachable or attached to the second retention plate of the mandibular member,
a maxillary alignment member form-fittingly connected to the maxillary adaptor and a mandibular alignment member form-fittingly connected to the mandibular adaptor,
wherein the maxillary and mandibular alignment members abut each other and are automatically alignable against each other and are alignable to grooves and form-fittingly engaging protrusions,
scanning members or indicators disposed on or at the alignment member or members for indication of an arrangement resulting from the alignment members and the adaptors aligned in a vertical alignment, and
wherein a relative position of the arrangement in relation to the articulator is detectable via a scanner.

2. The articulator according to claim 1, comprising
a casting compound as a fixing material that is curable, for form-fitting alignment between the maxillary adaptor and the maxillary alignment member or between the mandibular adaptor and the mandibular alignment member.

3. The articulator according to claim 1,
wherein the maxillary and mandibular adaptors or the maxillary and mandibular alignment members are pot-shaped and
wherein after introducing a liquid casting compound, the maxillary and mandibular adaptors are fixed to the maxillary and mandibular alignment members, respectively.

4. The articulator according to claim 1,
wherein the maxillary and/or mandibular adaptors and the maxillary and/or mandibular alignment members are free of casting compound and/or and are form-fittingly connected to each other respectively by a screwable clamping assembly.

5. The articulator according to claim 1,
wherein the alignment members, upon alignment to each other, form at least one flush surface.

6. The articulator according to claim 1,
wherein the scanning members comprise at least one scanning member formed by a line or edge at an alignment member.

7. The articulator according to claim 6,
wherein at least one scanning member is formed by a dividing line between the maxillary alignment member and the mandibular alignment member, which extends in an occlusal plane or a plane of a Bonwill's triangle.

8. The articulator according to claim 1,
wherein the alignment members in the form-fitting connection adhere to each other by magnetic promotion, and form a geometric three-dimensional basic shape comprising a cube, a pyramid or a shape that is composed of geometrical three-dimensional basic shapes.

9. The articulator according to claim 1,
wherein an attachment extension of each adaptor immerses into a pot-shaped associated alignment member and is attachable therein.

10. The articulator according to claim 1,
wherein the maxillary adaptor is releasably attached to the maxillary member, by a magnetic connection, and the mandibular member is releasably attached to the mandibular adaptor by a magnetic connection, and/or
wherein the maxillary adaptor is magnetically connected to the mandibular member via the maxillary member and/or the mandibular adaptor.

11. The articulator according to claim 1,
wherein a releasable fixed connection is provided between the alignment members, which are form fit and firmly connectable.

12. The articulator according to claim 6,
wherein the at least one scanning member is formed by a vertical groove extending in the sagittal plane at a line or edge at an alignment member.

13. An articulator scanning system comprising
(i) an articulator comprising
a maxillary member having a first retention plate and a mandibular member having a second retention plate,
wherein the maxillary and mandibular members are connected to each other via condylar articulations,
a maxillary adaptor having a third retention plate below the first retention plate and attachable or attached to the first retention plate of the maxillary member and a mandibular adaptor having a fourth retention plate above the second retention plate and attachable or attached to the second retention plate of the mandibular member,
a maxillary alignment member form-fittingly connected to the maxillary adaptor and a mandibular alignment member form-fittingly connected to the mandibular adaptor,
wherein the maxillary and mandibular alignment members abut each other and are automatically alignable against each other and are alignable to grooves and form-fittingly engaging protrusions,
scanning members or indicators disposed on or at the alignment member or members for indication of an arrangement resulting from the alignment members and the adaptors aligned in a vertical alignment, and
wherein a relative position of the arrangement in relation to the articulator (10) is detectable via a scanner, and
(ii) a scanner,
wherein the scanner comprises a mounting area that is compatible to the maxillary adaptor and/or the mandible adaptor and
wherein an arrangement of alignment members and adaptors is storable in or at the scanner for scanning.

\* \* \* \* \*